US010574813B2

(12) United States Patent
Inoue

(10) Patent No.: US 10,574,813 B2
(45) Date of Patent: Feb. 25, 2020

(54) PRIVATE BRANCH EXCHANGE SYSTEM

(71) Applicant: KYOCERA Document Solutions Inc., Osaka (JP)

(72) Inventor: Yasufumi Inoue, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 15/942,506

(22) Filed: Mar. 31, 2018

(65) Prior Publication Data
US 2019/0245968 A1    Aug. 8, 2019

(30) Foreign Application Priority Data

Mar. 31, 2017  (JP) ................................ 2017-071581

(51) Int. Cl.
*H04M 3/42* (2006.01)
*H04M 3/436* (2006.01)

(52) U.S. Cl.
CPC ... *H04M 3/42263* (2013.01); *H04M 3/42314* (2013.01); *H04M 3/42357* (2013.01); *H04M 3/4365* (2013.01); *H04M 2242/28* (2013.01); *H04M 2242/30* (2013.01)

(58) Field of Classification Search
USPC ........................................................ 379/284
See application file for complete search history.

(56) References Cited

U.S. PATENT DOCUMENTS

| 5,515,426 A | * | 5/1996 | Yacenda | G08B 3/1083 |
| | | | | 250/338.1 |
| 6,603,973 B1 | * | 8/2003 | Foladare | H04M 3/42229 |
| | | | | 340/7.21 |
| 2005/0002500 A1 | | 6/2005 | Kumai | |
| 2005/0213723 A1 | * | 9/2005 | Chung | H04M 3/387 |
| | | | | 379/201.06 |

(Continued)

FOREIGN PATENT DOCUMENTS

JP    H07-131535 A    5/1995
JP    H08-107453 A    4/1996

(Continued)

OTHER PUBLICATIONS

Japan Patent Office. Office Action of foreign counterpart. Dated Oct. 29, 2019.

*Primary Examiner* — Harry S Hong
(74) *Attorney, Agent, or Firm* — Hawaii Patent Services; Nathaniel K. Fedde; Kenton N. Fedde

(57) ABSTRACT

To provide a private branch exchange system that can take appropriate measures for a user designated incoming call even when the user takes an unscheduled action. A user status determination part of the private branch exchange transmits, when receives a user designated incoming call, the position confirmation request to the mobile cellular apparatus identified by the mobile cellular apparatus information of the user information. The incoming call control part of the private branch exchange forwards, if the user current position received from the mobile cellular apparatus is different from the schedule information, an incoming call (Continued)

to a telephone set installed near the user and having an extension telephone number based on the user current position and the layout information.

5 Claims, 6 Drawing Sheets

(56) References Cited

U.S. PATENT DOCUMENTS

| | | | |
|---|---|---|---|
| 2006/0093117 A1* | 5/2006 | Agrawal | H04M 3/42357 379/211.01 |
| 2007/0274494 A1 | 11/2007 | Awamoto et al. | |
| 2011/0072154 A1 | 3/2011 | Bogdanovic et al. | |
| 2011/0243316 A1 | 10/2011 | Crucs | |
| 2012/0197992 A1* | 8/2012 | Meyer | H04N 5/44543 709/204 |
| 2013/0029648 A1* | 1/2013 | Soundrapandian | H04M 1/7253 455/416 |
| 2014/0080464 A1* | 3/2014 | Kotzer | H04M 7/003 455/414.1 |

FOREIGN PATENT DOCUMENTS

| | | |
|---|---|---|
| JP | 2004-349802 A | 12/2004 |
| JP | 2005-244863 A | 9/2005 |
| JP | 2007-306515 A | 11/2007 |
| WO | 2006090894 A1 | 8/2006 |

* cited by examiner

| User Name | User X | |
|---|---|---|
| User Identification Information | 101 | |
| Mobile Cellular Apparatus Identification Information | #001 | |
| Extension Telephone Number | 1004 | |
| Caller Rank Information | A rank | 1001, 035512AAAA |
| | B rank | 1002, 035512BBBB |

User X

| Date/Time Information | Conference Place | Conference Rank |
|---|---|---|
| 3/21, 10:00 ~ 11:00 | 1st Conference Room | A |
| 3/21, 14:00 ~ 16:00 | 2nd Conference Room | A |
| 3/22, 15:00 ~ 16:00 | 1st Conference Room | A |
| 3/23, 14:00 ~ 15:00 | 3rd Conference Room | B |

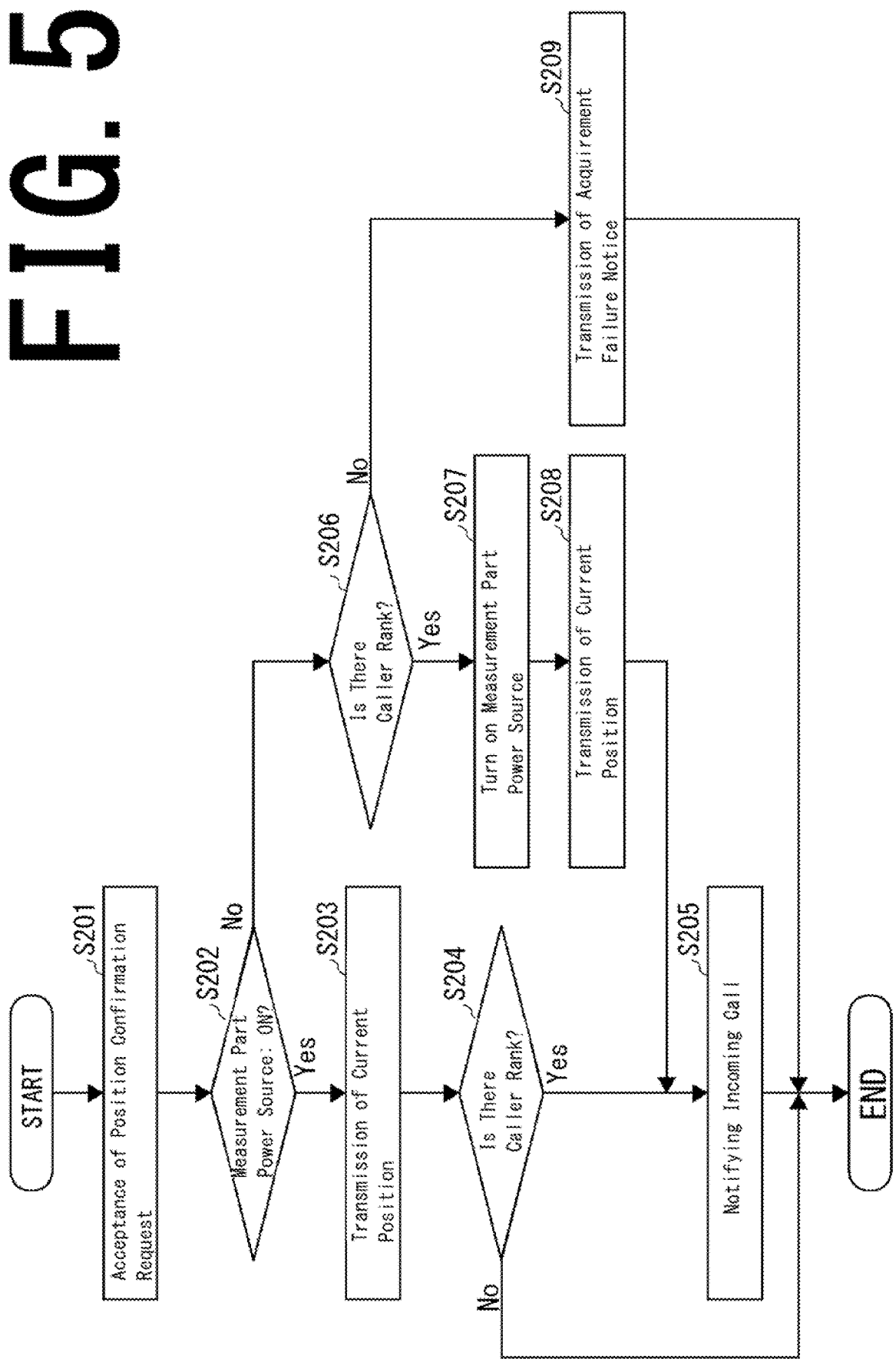

PRIVATE BRANCH EXCHANGE SYSTEM

INCORPORATION BY REFERENCE

This application is based on and claims the benefit of priority from Japanese Patent Application No. 2017-071581 filed on Mar. 31, 2017 the contents of which are hereby incorporated by reference.

BACKGROUND

The present disclosure relates to a private branch exchange system that responds to an incoming call from a station line or an extension line.

There has been proposed a technique of transmitting and transferring a response message based on the schedule of a callee person.

SUMMARY

A private branch exchange system according to the present disclosure includes a user's mobile cellular apparatus and a private branch exchange that has a communication path between connected telephone sets and a communication path between the telephone sets and a public switched telephone network. The user's mobile cellular apparatus includes a position measuring part that locates a current position of the mobile cellular apparatus and a response part that transmits the current position, as a user current position, which is located by the position measuring part in response to a position confirmation request from the private branch exchange. The private branch exchange includes user information, schedule information, layout information, a user status determination part, and an incoming call control part. The user information registers user identification information that identifies the user, mobile cellular apparatus identification information that identifies the user's mobile cellular apparatus, and an extension telephone number of a telephone set to be used by the user who sits at his/her desk in an association manner. The schedule information registers date/time information that is indicative of a scheduled date/time for a conference and a meeting position at which the conference is held in an association manner. The layout information includes an in-premises layout and installation information that is indicative of how the telephone sets are installed. The user status determination part transmits, when receives a user designated telephone call, the position confirmation request to the mobile cellular apparatus identified by the mobile cellular apparatus information of the user information. The incoming call control part forwards, if the user current position received from the mobile cellular apparatus is different from the schedule information, an incoming call to a telephone set installed near the user and having an extension telephone number based on the user current position and the layout information.

BRIEF DESCRIPTION OF THE DRAWINGS

FIG. 2A is a diagram showing an example of user information and an example of schedule information which are shown in FIG. 1;

FIG. 2B is a diagram showing an example of user information and an example of schedule information which are shown in FIG. 1;

FIG. 5 is a flowchart that explains how the mobile cellular apparatus shown in FIG. 1 operates.

DETAILED DESCRIPTION

Figure 1:
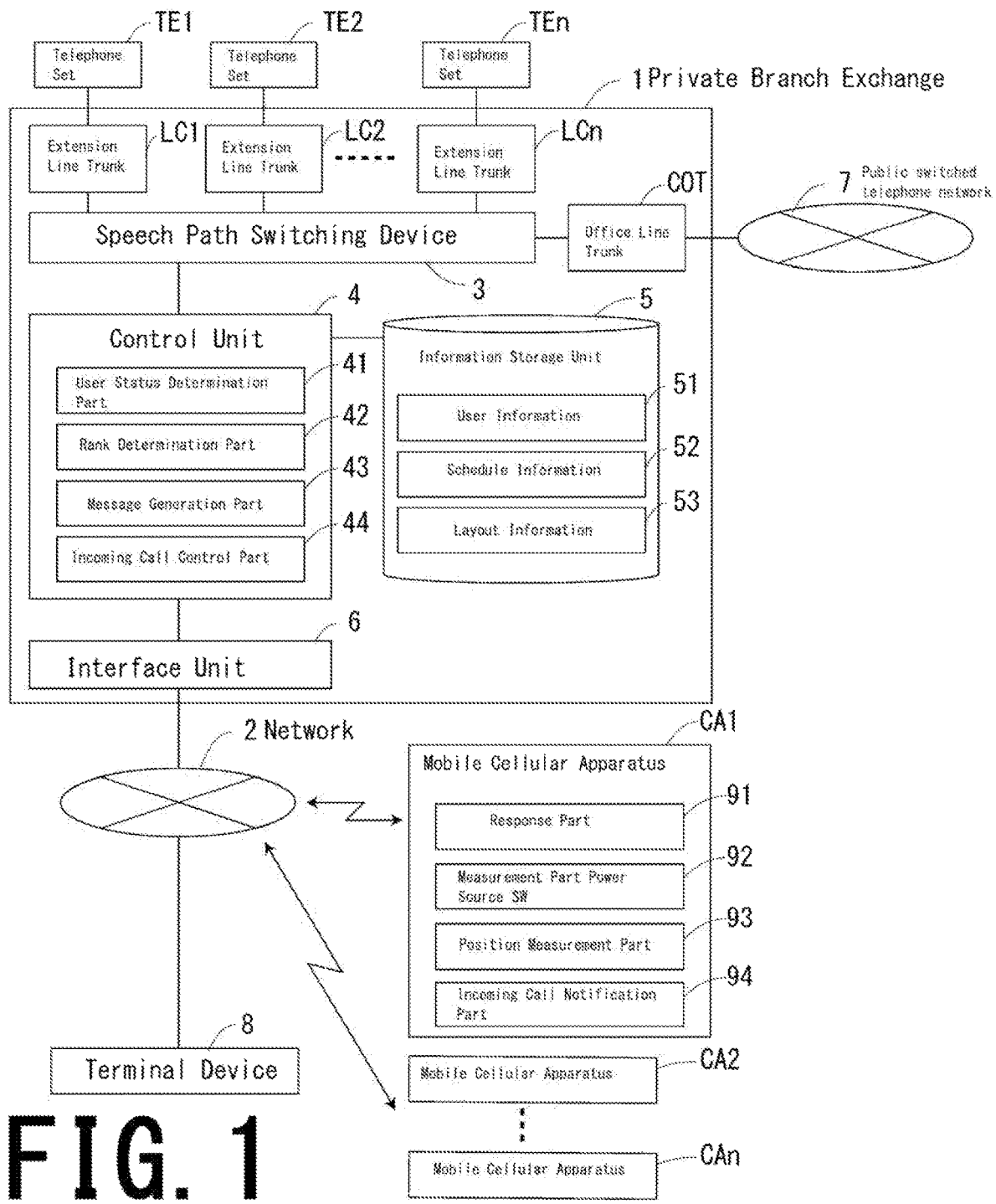
FIG. 1 is a block diagram showing a schematic configuration of an embodiment of a private branch exchange system according to the present disclosure.

Hereinbelow, with reference to the attached drawings, embodiments of the present disclosure will be described in detail. In the following embodiments, the same reference numerals are given to the corresponding configurations provided with similar functions.

With reference to FIG. 1, a private branch exchange system of the present embodiment includes a private branch exchange 1 and mobile cellular apparatuses CA (CA1 to CAn) that can be in communication with the private branch exchange 1 via a network 2 such as the Internet, a LAN or the like. The private branch exchange 1, when accepts an incoming call that designate a user, confirms a user situation based on the mobile cellular apparatuses CA which each of the users holds and conducts a response action depending on the confirmed user situation. It is to be noted that as each the mobile cellular apparatus what each the user always carries in premisesis available such as an employee's card, an ID card, a name plate, and the like.

The private branch exchange 1 includes a speech path switch device 3, extension line trunks LC (LC 1 to LCn), a central office trunk COT, a control unit 4, an information storage unit 5, and an interface unit 6.

Under the control action of the control unit 4, the speech path switching device 3 conducts executions, including forming a speech path between telephone sets TE (TE 1 to TEn) and forming a speech path between the telephone sets TE 1 to TEn and a public switched telephone network 7.

The extension trunks LC1 to LCn, which are connected to the speech path switch 3, accommodate the telephone sets TE1 to TEn, respectively. The central office trunk COT, which is connected to the speech path switch 3, accommodates the office line connected to the public network 7.

The control unit 4 is an arithmetic processing circuit such as a microcomputer that includes, for example, a CPU, a ROM, and a RAM. In the ROM, a control program for controlling the operation of the private branch exchange 1 is stored. The control unit 4 reads the control program stored in the ROM and develops the control program in the RAM, thereby executing control over the entire apparatus. In addition, the control unit 4 functions as a user situation determination part 41, a rank determination part 42, a message generation part 43, and an incoming call control part 44.

The information storage unit 5 is storage means such as a semiconductor memory, an HDD, or the like. In the storage unit 5, user information 51, schedule information 52, and layout information 53 are stored. The user information 51, the schedule information 52, and the layout information 53 are to be registered, changed, and deleted from, for example, a terminal device 8 such as a computer or the like which is connected to the network 2.

The user information 51 is information that is prepared for each the user. With reference to FIG. 2A, the user information 51 includes user identification information for identifying a user, cellular apparatus identification information for identifying the mobile cellular apparatus CA carried by the user, an in-house telephone number of telephone TE used by the user when he/she sits at his/her desk and caller rank information which are registered in an association manner. The caller rank information, which is information that is indicative of the priority order of the caller, is for registering an external line number and an extension number. In the present embodiment, as the caller rank information the highest A rank and the next B rank can be registered.

The schedule information 52, which is a schedule prepared for each of the users, as shown in FIG. 2B, date/time information that is indicative of a date/time at which a meeting is to be held, a conference place where a conference is to be held, and a conference rank are registered in an association manner. In the present embodiment, the highest A rank and the next rank, i.e., B rank can be registered as the conference rank.

Figure 3:
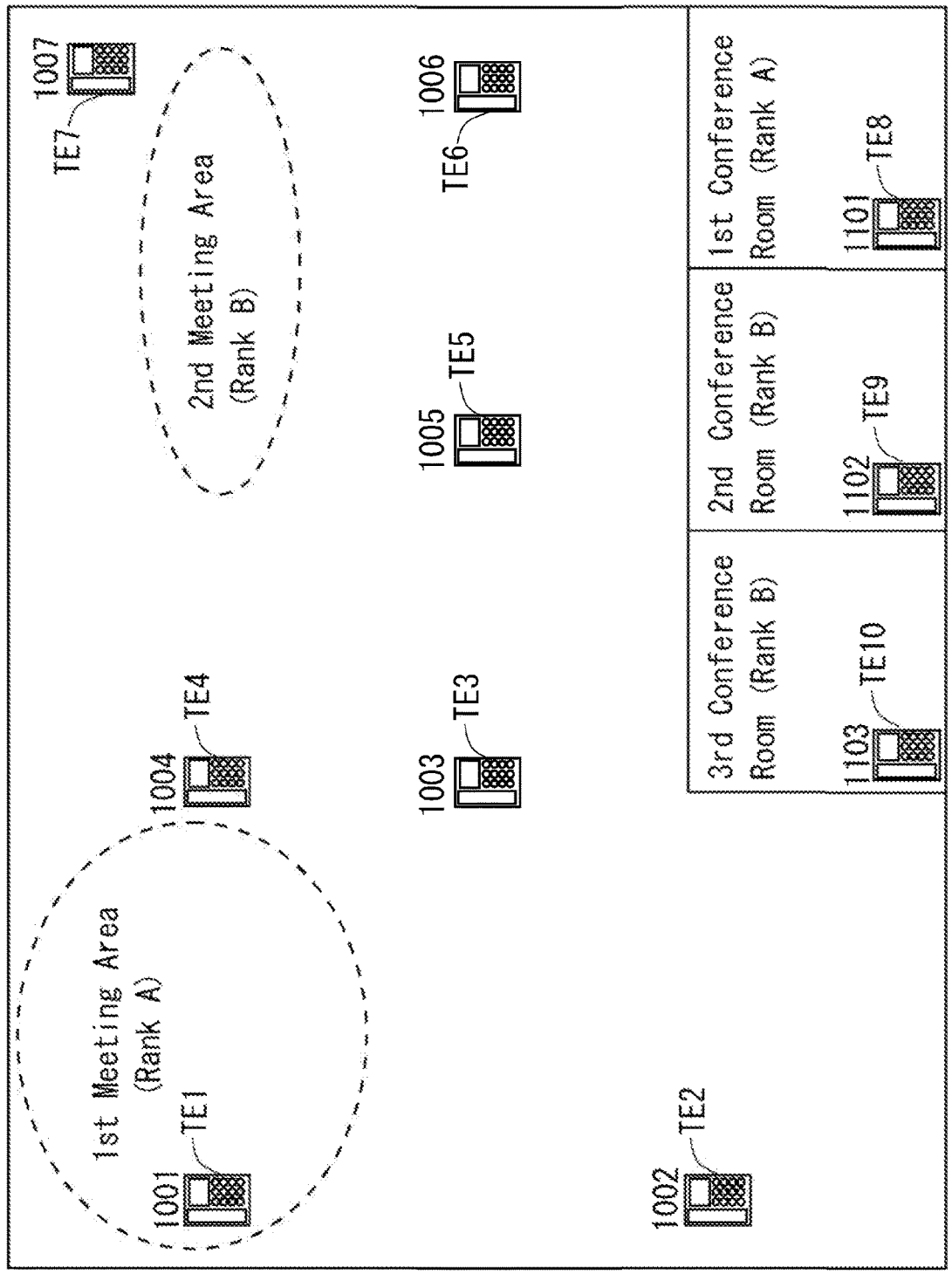
FIG. 3 is a diagram showing an example of layout information shown in FIG. 1.

As shown in FIG. 3, the layout information 53 has a layout of a premises, arrangement information of the telephone sets TE 1 to TE 10 that are installed in the premises, and position rank information. The position rank information is information that is indicative of a priority order of places that include, for example, a conference room and a meeting area. In the present embodiment, the highest A rank and the next B rank can be registered as the position rank information. In addition, the layout information 53 has information on the position of each the user's presence.

The mobile cellular apparatus CA includes a response part 91, a measurement part power source switch 92, a position measurement part 93, and an incoming call notification part 94.

The response part 91, which responds to a position confirmation request received from the private branch exchange 1 via the network 2, conducts a transmission of a current position or an acquisition failure notification to the private branch exchange 1. In addition, if the caller rank is added to the position confirmation request, the response part 91 causes the incoming call notification part 94 to notify the concerned user of the incoming call.

The measurement part power source switch 92, which is for turning on and off the power supply of the position measurement part 93, is configured to be operable by the user and to be operable by the control of the response part 91.

The position measurement part 93 locates the position of the mobile cellular apparatus CA in the premises. As the position measurement part 93, for example, a GPS is used. In addition, the position measurement part 93 may be in the form of a beacon that locates the position based on signals output from a plurality of transmitters installed in the premises.

The incoming call notification part 94 is a vibration generating unit that is made up of a piezoelectric element and other elements. The incoming call notification part 94 generates a vibration based on an instruction of the response part 91 and notifies the user who carries the mobile cellular apparatus CA of the incoming call.

Figure 4:
FIG. 4 is a flowchart that explains how the private branch exchange shown in FIG. 1 operates.

Next, with reference to FIGS. 4 and 5, the operation of the private branch exchange system of the present embodiment will be described in detail.

At first, with reference to FIG. 4, the operation of the private branch exchange 1 will be described. The control unit 4 of the private branch exchange 1, when accepts a user-designated incoming call (step S101), functions as the user situation determination part 41. The user situation determination part 41 identifies the mobile cellular apparatus CA carried by the user with reference to the user information of the designated user (step S102) and confirms of the caller's telephone number registration in the caller rank information (Step S103). In addition, the user situation determination part 41 refers to the schedule information 52 to confirm the user's schedule (step S104).

Next, the user situation determination part 41 transmits the position confirmation request to the mobile cellular apparatus CA identified in step S102 via the interface unit 6 (step S105). It is to be noted that if the caller's telephone number is registered in the caller rank information in step S103, the caller rank (A rank or B rank) is added to the position confirmation request so as to be transmitted therewith in step S105.

Next, with reference to FIG. 5, the operation of the mobile cellular apparatus CA that has received the position confirmation request will be described.

The response part 91, when receives the position confirmation request from the private branch exchange 1 (step S201), determines whether or not the power source of the position measurement part 93 is turned on (step S202).

If the power source of the position measurement part 93 is determined to be turned on in step S202, the response part 91 transmits the current position located by the position measurement part 93 to the private branch exchange 1 (step S203).

Next, the response part 91 determines whether or not the caller rank is added to the position confirmation request (step S204).

If the addition of caller rank is determined in step S204, the response part 91 causes the incoming call notification part 94 to generate a vibration to notify the user who carries on the mobile cellular apparatus CA of the incoming call (step S205) and then terminates the operation. It is to be noted that, as to the vibration generated by the incoming call notification part 94, changing the vibration pattern depending on the caller rank is preferable due to enabling the user to recognize the caller rank. Unless the addition of caller rank is determined in step S204, the response part 91 terminates immediately the operation.

If the power supply of the position measurement part 93 is determined to be turned off in step S202, the response part 91 determines whether or not the caller rank is added to the position confirmation request (step S206).

If the addition of caller rank is determined in step S206, the response part 91 operates the measurement part power source switch 92 to turn on the power supply of the position measurement part 93 (step S207) and transmits the current position located by the current measurement part 93 to the private branch exchange 1 (step S208), and the control goes to step S205.

Unless the addition of caller rank is determined in step S206, the response part 91 transmits an acquisition failure notification indicating that locating the current position is impossible to the private branch exchange 1 (step S209) and terminates the operation.

Referring again to FIG. 4, the operation of the private branch exchange 1 will be described. The user situation determination part 41, in response to the position confirmation request transmitted in step S104, determines whether or not the current position has been received from the mobile cellular apparatus CA (step S106).

In step S106, if the acquisition failure notification is received instead of the current position, the user situation determination part 41 determines whether or not the user sits at his/her desk based on the schedule information 52 (step S107).

In step S107, if the user is determined to sit at his/her desk, the control unit 4 functions as the incoming call control part 44, calls the telephone set TE of the local telephone number registered in the user information 51 (step S108), and terminates the operation.

If it is determined in step S107 that the user does not sit at his/her desk but is at a conference, the control unit 4 functions as the rank determination part 42. The rank determination part 42 compares the caller rank with the conference rank registered in the schedule information 52 (step S109) and determines whether or not the caller rank is equal to or higher than the conference rank (step S110).

In step S110, if the caller rank is determined to be equal to or higher than the conference rank, the control unit 4 functions as the incoming call control part 44. Then, the incoming call control part 44 calls, based on the schedule information 52 and the layout information 53, the telephone set TE of the local telephone number which is installed at the conference place registered in the schedule information 52 (step S111) and terminates the operation. For example, if the incoming calling designating Mr. X, the user who is currently in the conference at the first conference room at 10:30 on March 21 is from "extension 1001", according to the user information 51 and the schedule information 52 both of which are shown in FIG. 2, the caller rank (A rank) is equal to or higher than the conference rank (A rank) in step S110. Accordingly, with reference to the layout information 53 shown in FIG. 3, in step S111, the telephone set TE 8 of extension 1101 which is installed in the first conference room is called.

In step S110, if the caller rank is determined to be less than the conference rank, the control unit 4 functions as the message generating part 43, makes a response to the caller by generating a message notifying that the user leaves his/her desk now (step S112), and terminates the operation. It is to be note that the message generated in step S111 may include a scheduled end time of the conference and/or the scheduled next period of sitting at his/her desk. For example, if an incoming call, which designates Mr. X, the user who is currently in a conference at the first conference room at 10:30 on March 21, is received from a B rank telephone set or a telephone set that is not registered in the user information 51, according to the user information 51 and the schedule information 52 both of which are shown in FIG. 2, the caller rank (B rank) is less than the conference rank (A rank) in step S110. Accordingly, no calling is forwarded to Mr. X, the user during the conference and a message response is made in step S112.

If the current position is received in step S106, the user situation determination part 41 determines whether or not the current position of the user is in accordance with the schedule based on the schedule information 52 (step S113), and if the current position is determined to be in accordance with the schedule, the control goes to step S107.

Unless the current position is determined to be in accordance with the schedule, the control unit 4 functions as the rank determination part 42. The rank determination part 42 compares the caller rank with the position rank set in the layout information 53 (step S114) and determines whether or not the caller rank is equal to or greater than the position rank (step S115).

If the caller rank is determined to be equal to or higher than the position rank in step S115, the control section 4 functions as the incoming call control section 44, calls the telephone TE of the local telephone number installed near the user based on the current position and the layout information 53 (step S116), and terminates the operation. For example, if a calling that designates Mr. X, the user who is during a conference in the second meeting area is from "extension 1002", according to the user information 51 and the layout information 53 which are shown in FIG. 2, in step S115, the caller rank (B rank) is equal to or higher than the position rank (B rank). Therefore, in step S116, the telephone set TE 7 of the extension 1007 which is installed near the second meeting area is called.

If the caller rank is less than the position rank in step S115, the control unit 4 functions as the message generation part 43, generates a message notifying that the user does not sit at his/her desk and responds to the caller (step S117), and terminates the operation. For example, if an incoming call that designates Mr. X, the user, who is during a meeting in the second meeting area is received from a telephone set that is not registered in the user information 51, according to the user information 51 and the layout information 53 which are shown in FIG. 2, in step S115, the caller rank (no rank is assigned) is determined to be less than the conference rank (B rank). Therefore, a message response is made in step S117 without receiving the incoming call to the user, Mr. X, the user who is during the conference.

As described above, according to the present embodiment, the private branch exchange system includes a user's mobile cellular apparatus CA and a private branch exchange 1 that has a communication path between connected telephone sets TE and a communication path between telephone sets and a public switched telephone network 7. The user's mobile cellular apparatus CA includes a position measurement part 93 that locates a current position of the mobile cellular apparatus CA and a response part 91 that transmits the current position, as a user current position, which is located by the position measurement part 93 in response to a position confirmation request from the private branch exchange 1. The private branch exchange 1 includes user information 51, schedule information 52, layout information 53, a user status determination part 41, and an incoming call control part 44. The user information 51 that registers user identification information that identifies the user, mobile cellular apparatus identification information that identifies the user's mobile cellular apparatus CA, and an extension telephone number of a telephone set to be used by the user who sits at his/her desk in an association manner. The schedule information 52 registers date/time information that is indicative of a scheduled date/time for a conference and a conference position at which the conference is held in an association manner. The layout information 53 includes an in-premises layout and installation information that is indicative of how the telephone sets TE are installed. The user status determination part 41 transmits, when receives a user designated incoming call, the position confirmation request to the mobile cellular apparatus CA identified based on the mobile cellular apparatus information of the user information 51. The incoming call control part 44 forwards, if the user current position received from the mobile cellular apparatus CA is different from the schedule information, an incoming call to a telephone set TE installed near the user and having an extension telephone number based on the user current position and the layout information.

With this configuration, it is possible to forward the incoming call to the telephone set TE based on the user's current position and the layout information, which makes it possible to take appropriate measures against the user designated incoming call even when the user takes an unscheduled action.

Further, in the present embodiment, a caller rank that is indicative of a caller's priority is registered in the user information 51 and a position rank that is indicative of a position's priority is registered in the layout information 53. The incoming call control part 44 forwards, if the caller rank is higher than the position rank, if the caller rank is equal to or higher than the position rank, an incoming call to a telephone set TE installed near the user and having an extension telephone number. In addition, the private branch exchange system further includes a message generation part 43 that generates, if the caller rank is less than the position rank, a message notifying that the user leaves his/her desk to respond to the caller.

With this configuration, it is possible to treat the incoming call such that the caller rank is selected that is higher than the position rank in priority.

Moreover, in the present embodiment, the caller rank that is indicative of the caller's priority is registered in the user information 51 and the conference rank that is indicative of the conference's priority is registered in the schedule information 52. The incoming call control part 44 forwards, if the user current position received from the mobile cellular apparatus CA is the conference position which meets the schedule information and concurrently the caller rank is equal to or higher than the conference rank, an incoming call to the telephone set TE installed in the conference room and having an extension telephone number. In addition, the private branch exchange of the present embodiment includes the message generation part 43 that generates, if the caller rank is less than the conference rank, a message notifying that the user leaves his/her desk and concurrently notifying a scheduled end time of the conference or the next scheduled time while the user sits at his/her desk based on the schedule information 52, to respond to the caller.

With this configuration, it is possible to treat the incoming call such that the caller rank is selected that is higher than the conference rank in priority.

The conventionally proposed technologies and the like do not assume a case of a person's unscheduled absence, which raises a problem wherein no appropriate measures can be taken if, for example, the person leaves his/her desk without updating his/her schedule information due to an emergency meeting or the like.

According to the present disclosure, it is possible for a telephone set TE to receive an incoming call based on the user's current position and the layout information, which makes it possible to provide an effect of taking appropriate measures against a user designated incoming call even when the user takes an unscheduled action.

It is to be noted that the present disclosure is not limited to the above each the embodiment, and it is apparent that each embodiment can be appropriately changed or modified within the scope of the technical idea of the present disclosure. Further, the number, the position, the shape, and the like of the above-described constituent members are not limited to those in the above embodiment but may be modified in a suitable manner for implementing the present disclosure. In each Figure, the same reference numerals are given to the same constituent elements.

What is claimed is:

1. A private branch exchange system comprising:
a user's mobile cellular apparatus; and
a private branch exchange that includes a communication path between connected telephone sets and a communication path between the telephone sets and a public switched telephone network,
the mobile cellular apparatus including
a position measurement part that locates a current position of the mobile cellular apparatus and a response part that transmits the current position, as a user current position, which is located by the position measurement part in response to a position confirmation request from the private branch exchange,
the private branch exchange including
user information in which user identification information that identifies the user, mobile cellular apparatus identification information that identifies the user's mobile cellular apparatus, and an extension telephone number of a telephone set to be used by the user when he/she sits at his/her desk are registered in an association manner,
schedule information in which date/time information that is indicative of a scheduled date/time for a conference and a conference position at which the conference is to be held are registered in an association manner,
layout information that includes an in-premises layout and installation information that is indicative of where the telephone sets are installed, wherein the telephone sets included in the layout information comprise the telephone set having the extension telephone number present in the user information, and a telephone set installed at the conference position,
a user status determination part that transmits, responsive to receiving a user designated incoming call, the position confirmation request to the mobile cellular apparatus identified based on the mobile cellular apparatus information of the user information, and
an incoming call control part that
sends, if first criteria are met, the user designated incoming call to a near-user-installed telephone set having an extension telephone number based on a comparison of the user current position and the layout information, wherein the first criteria comprise a determination that the user current position received from the mobile cellular apparatus is different from the schedule information; and
sends, if second criteria are met, the user designated incoming call to the telephone set having the extension telephone number present in the user information or the telephone set installed at the conference position, wherein the second criteria comprise a determination that the user current position received from the mobile cellular apparatus corresponds to the schedule information.

2. The private branch exchange system according to claim 1, wherein
the user designated incoming call has a caller with a caller rank that is indicative of the caller's priority and the caller rank is registered in the user information and a position rank that is indicative of a position priority is registered in the layout information, and
the first criteria further comprise a determination that the caller rank is equal to or higher than the position rank.

3. The private branch exchange system according to claim 2, wherein the private branch exchange further comprises a message generation part that generates, if the user current position received from the mobile cellular apparatus is different from the schedule information and the caller rank is less than the position rank, a message notifying that the user leaves his/her desk to respond to the caller.

4. The private branch exchange system according to claim 1, wherein
the user designated incoming call has a caller with a caller rank that is indicative of the caller's priority and the caller rank is registered in the user information and a conference rank that is indicative of a conference priority of the conference is registered in the schedule information, and the incoming call control part sends, if the second criteria is met and the user current position received from the mobile cellular apparatus is the conference position and concurrently the caller rank is equal to or higher than the conference rank, an incoming call to the telephone set installed at the conference position.

5. The private branch exchange system according to claim 4, wherein the private branch exchange further comprises a message generation part that generates, if the user current position received from the mobile cellular apparatus corresponds to the schedule information and the caller rank is less than the conference rank, a message notifying that the user leaves his/her desk and concurrently notifying a scheduled end time of the conference or the next scheduled time while the user sits at his/her desk based on the schedule information, to respond to the caller.

* * * * *